United States Patent
Krulitsch (10) Patent No.: US 10,538,423 B2
(45) Date of Patent: Jan. 21, 2020

(54) FILLING SYSTEM AND FILLING PACKAGES

(71) Applicant: KHS GmbH, Dortmund (DE)

(72) Inventor: Dieter-Rudolf Krulitsch, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 81 days.

(21) Appl. No.: 15/735,733

(22) PCT Filed: Jun. 13, 2016

(86) PCT No.: PCT/EP2016/063457
§ 371 (c)(1),
(2) Date: Dec. 12, 2017

(87) PCT Pub. No.: WO2016/207005
PCT Pub. Date: Dec. 29, 2016

(65) Prior Publication Data
US 2018/0170740 A1 Jun. 21, 2018

(30) Foreign Application Priority Data

Jun. 23, 2015 (DE) ......................... 10 2015 110 063

(51) Int. Cl.
| | |
|---|---|
| *B67C 3/28* | (2006.01) |
| *F16K 11/00* | (2006.01) |
| *B67C 3/26* | (2006.01) |
| *F16K 23/00* | (2006.01) |
| *B67C 3/00* | (2006.01) |
| *B67C 3/06* | (2006.01) |
| *B67C 3/22* | (2006.01) |

(52) U.S. Cl.
CPC ............... *B67C 3/28* (2013.01); *B67C 3/004* (2013.01); *B67C 3/06* (2013.01); *B67C 3/225* (2013.01); *B67C 3/2617* (2013.01); *F16K 19/00* (2013.01); *F16K 23/00* (2013.01)

(58) Field of Classification Search
CPC ..... B67C 3/2617; B67C 3/2654; B67C 3/225; B67C 3/28; F16K 19/00; F16K 23/00
USPC .......................................... 141/57, 256, 264
See application file for complete search history.

(56) References Cited

U.S. PATENT DOCUMENTS

| | | | | |
|---|---|---|---|---|
| 4,410,302 | A * | 10/1983 | Chiba | F04B 53/06 417/299 |
| 4,984,601 | A * | 1/1991 | Andersson | B08B 9/00 137/486 |
| 5,450,877 | A * | 9/1995 | Graffin | F16K 31/086 137/630.14 |
| 6,810,931 | B2 * | 11/2004 | Graffin | B67C 3/26 141/301 |

(Continued)

FOREIGN PATENT DOCUMENTS

| | | |
|---|---|---|
| DE | 11 05 746 | 4/1961 |
| DE | 42 07 346 | 9/1993 |

(Continued)

*Primary Examiner* — Timothy L Maust
(74) *Attorney, Agent, or Firm* — Occhiuti & Rohlicek LLP (57) ABSTRACT

A filling element includes a liquid valve having a valve element that forms part of the liquid channel. An electromagnetic drive couples to the valve element and moves it along a stroke axis such that the valve element moves while a valve body remains stationary. A gap across which the magnetic field extends lies outside the liquid channel.

17 Claims, 6 Drawing Sheets

(56) References Cited

U.S. PATENT DOCUMENTS

| | | | | |
|---|---|---|---|---|
| 7,717,396 | B2* | 5/2010 | Graffin | H01F 7/0242 251/65 |
| 8,579,250 | B1* | 11/2013 | Theobald | F16K 31/0613 251/129.09 |
| 10,189,693 | B2* | 1/2019 | Bruch | B67C 3/004 |
| 10,196,159 | B2* | 2/2019 | Glock | B65B 39/004 |
| 2009/0014086 | A1* | 1/2009 | MacMichael | B65B 1/08 141/12 |

FOREIGN PATENT DOCUMENTS

| | | |
|---|---|---|
| DE | 10 2012 21192 | 1/2014 |
| DE | 10 2013 10692 | 1/2015 |
| WO | WO92/008919 | 5/1992 |
| WO | WO2013/057695 | 4/2013 |

\* cited by examiner

FILLING SYSTEM AND FILLING PACKAGES

RELATED APPLICATIONS

This is the national-stage under 35 USC 371, of PCT application corresponding to PCT/EP2016/063457, filed on Jun. 13, 2016, which claims the benefit of the Jun. 23, 2015 priority date of German application DE 102015110063.0, the contents of which are herein incorporated by reference.

FIELD OF INVENTION

The invention relates to container-filling machines, and in particular, to filling elements used in a container-filling machine.

BACKGROUND

Known filling elements for dispensing liquid filling-material into a container include a channel having a valve that controls flow out of a dispensing opening and into a container. The liquid valve typically has a valve body that moves up and down. When the valve closes, the valve body engages a valve seat. When the valve opens, liquid filling-material flows around the valve body on its way out the discharge opening.

A useful way to move the valve body is to apply a magnetic field across the gap through which liquid filling-material is also flowing. This poses no difficulty because the sorts of beverages people drink generally do not interact with the magnetic field in any significant way.

It is also useful for the gap has to be reasonably wide so that filling can be rapid. A wide gap is particularly advantageous because it permits fruit fibers and the like to pass through without the risk of clogging the gap.

SUMMARY

The invention provides a filling element in which the magnetic field crosses a gap that is so narrow that, were filling material to pass through it, the filling process would slow to a trickle. In particular, the gap across which the magnetic field acts is so narrow that, were fiber-laden fluid to pass through it, it would quickly clog.

With the filling element according to the invention, the drive for opening and closing the liquid valve is a magnetic or electromagnetic drive. The magnetic field of this drive does not take effect on the valve body of the liquid valve. In fact, the body does not move when the valve opens and closes. Instead, the magnetic field takes effect on the valve element that that forms the valve seat. This is typically configured as a casing pipe.

The valve element, or the element provided at the valve element, forms the rotor of the magnetic or electromotor or electromagnetic drive. The magnetic gap of the drive is then located entirely outside the liquid channel on an outer face of the valve element, preferably between the movable outer surface of the valve element and a housing part of the filling element, which is not moved or must be moved for the opening and closing of the liquid valve. The non-moved part of the electromagnetic drive, formed as the stator, is then preferably provided for at this housing part.

In a simplified embodiment of the filling element, the electric motor or electromagnetic drive comprises at least two magnetic coils, which preferably form the stator. These coils are offset against one another in the direction of the valve or stroke axis in such a way that, on the activation of the one magnetic coil, the valve element is moved into the position blocking the liquid valve, and on the activation of the other magnetic coil it is moved into the position opening the liquid valve. For most applications it is entirely adequate if the filling element has only these two states.

In a further embodiment of the filling element, the electric motor or the electromagnetic drive for opening and closing the liquid valve is an electric motor, electromagnetic drive linear motor, or linear drive, e.g. with direct current drive or with synchronous alternating-current drive. The rotor of the linear drive is in turn the valve element that comprises or forms the valve seat, which is moved by the electrically-produced magnetic field of the drive, directly in a straight line along the valve axis or stroke axis, and specifically without the assistance of other mechanical components. In this case too, the required magnetic gap is located entirely outside the liquid channel so that no liquid filling-material flows through it. In this embodiment, the coil that produces the magnetic field is preferably the stator or the stator coil.

With the embodiment of the electromagnetic drive as a linear drive or linear motor, in addition to the completely opened and completely closed state, purely electrically controlled, it is possible to open the liquid valve with a reduced flow cross-section. The course of the opening and closing movement of the valve element can also again be purely electrically controlled. The existing liquid valve can therefore take on the function of a flow-regulating valve.

Regardless of the particular configuration in detail, with the filling element according to the invention the magnetic coil can be configured as extremely narrow, as a result of which it is not only possible to use the magnetic gap for guiding the moving valve element, but, as a result of this, it is also possible to attain a high degree of operational reliability when opening and closing the valve.

"Packing means" in the meaning of the invention are packages or containers, which are conventionally used, for example, in the food sector, and in that context in the beverage sector in particular, and especially containers such as bottles, cans, and also soft packages, for example such as are made of cardboard and/or plastic film and/or metal foil.

The term "free jet filling" in the meaning of the invention is to be understood in particular as a method in which the liquid filling-material flows to the packing means which are to be filled in a free filling jet, wherein the packing means are not in contact with a mouth or opening at the filling element, but are spaced at a distance from the filling element or from a liquid filling-material outlet located at that element.

The expression "essentially" or "approximately" in the meaning of the invention signifies deviations from a respective exact value by +/−10%, preferably by +/−5%, and/or deviations in the form of changes which are not of significance for the function.

Further embodiments, advantages, and possible applications of the invention can also be derived from the following description of exemplary embodiments and from the figures. In this situation, all the features described and/or represented as images are in principle the object of the invention, individually or in any combination, regardless of their summary representation in the claims or reference to them. The contents of the claims are also deemed constituent parts of the description.

BRIEF DESCRIPTION OF THE DRAWINGS

The invention is described hereinafter on the basis of figures relating to exemplary embodiments. The figures show.

DETAILED DESCRIPTION

Figure 1:
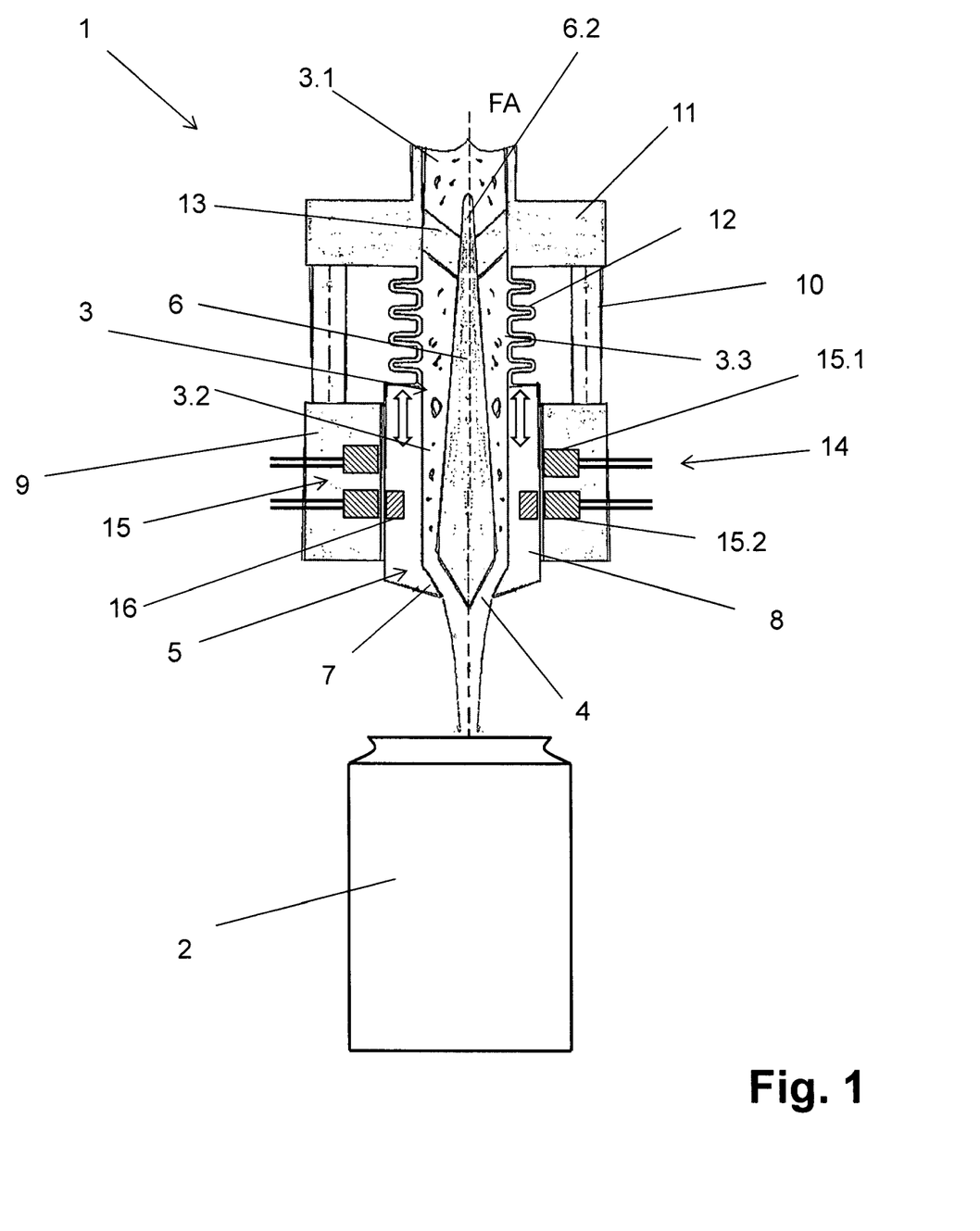
FIG. 1 in a schematic representation, a filling element according to the invention in the opened state, together with a packaging means to be filled, in the form of a container.
Figure 2:
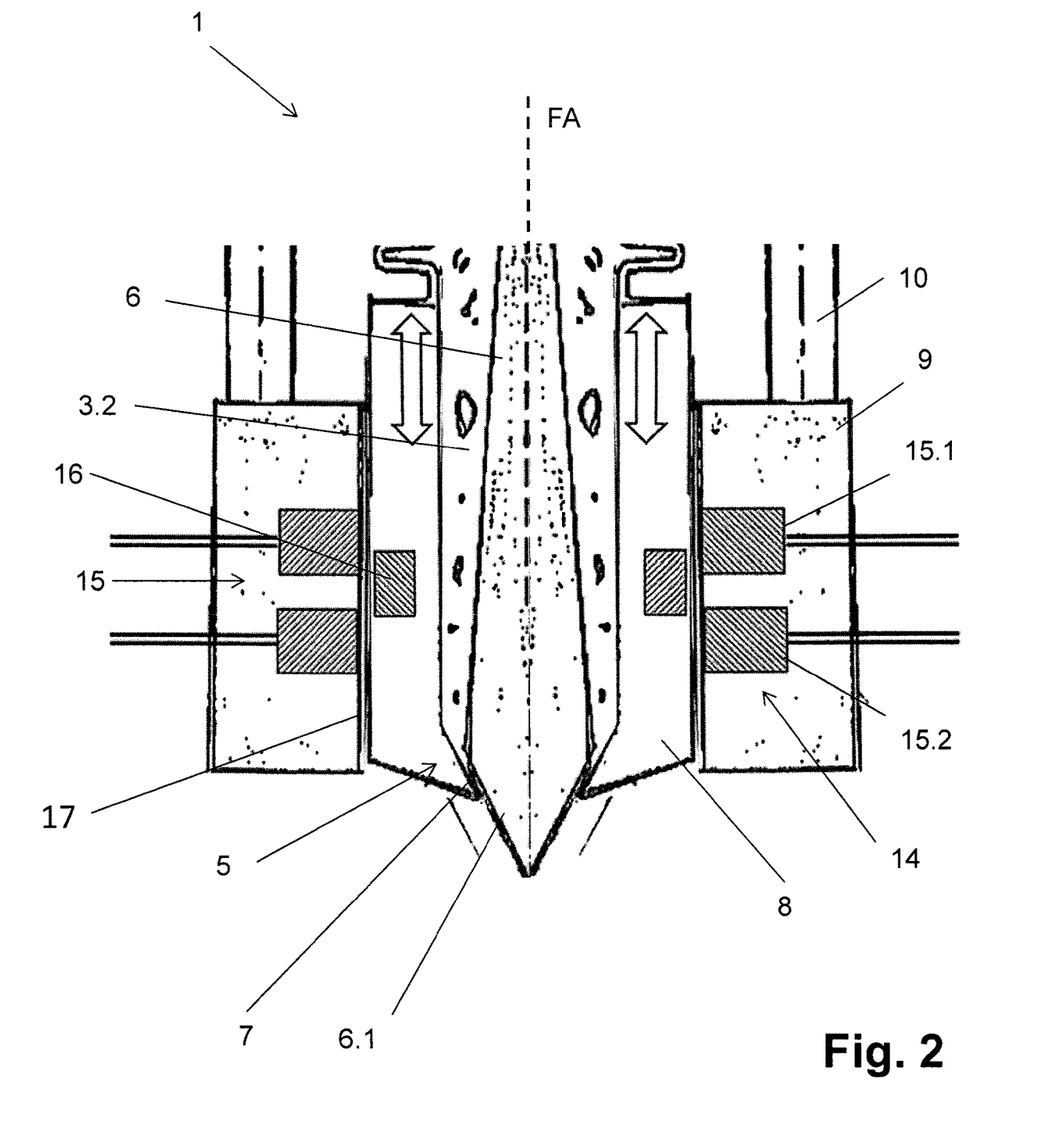
FIG. 2 in an enlarged part representation, the filling element from FIG. 1 in the closed state.

FIGS. 1 and 2 show a filling element 1 for controlled free-jet filling of containers 2 with liquid filling-material that contains solid constituents in suspension. Examples of solid constituents include fruit fibers and fruit pulp. A typical liquid filling-material with this property is fruit juice. In FIG. 1, the container 2 is a can. However, the filling element 1 can be used with other kinds of containers 2.

The filling element 1 is one of many identical filling elements of a filling system. A typical such filling system is one that has a rotor that is driven to rotate about a vertical machine-axis.

Within the filling element 1 is a liquid channel 3 having an upper channel-section 3.1 that connects to a tank containing the liquid filling-material. The liquid channel 3 ends in a dispensing opening 4 located at an underside of the filling element 1 remote from the upper channel-section 3.1.

The filling element 1 includes a liquid valve 5 disposed within the liquid channel 3. The liquid valve 5 has a valve body 6 that interacts with a valve seat 7 formed in the liquid channel 3. The valve body 6 extends between a lower valve-body section 6.1 and an upper valve-body section 6.2.

When the liquid valve 5 opens, as shown in FIG. 1, a gap separates the lower valve-body section 6.1 from the valve seat 7. When the liquid valve 5 closes, the lower valve-body section 6.1 contacts the valve seat 7, as shown in FIG. 2. In the illustrated embodiment, the lower valve-body section 6.1 is tapered to form a wedge that engages the valve seat 7.

In the embodiment shown, an inner surface of a valve element 8 forms the valve seat 7. In some embodiments, the valve element 8 is a valve element 8 that is open at both ends. The interior of the valve element 8 forms a middle channel-section 3.2 of the liquid channel 3 upstream of the dispensing opening 4, with "upstream" and "downstream" being defined in relation to the direction in which filling material flows during filling.

As suggested by the double-headed arrows and by a comparison of FIGS. 1 and 2, the valve element 8 opens and closes the liquid valve 5 by moving along a stroke axis FA. In the illustrated embodiment, the valve element 8 moves vertically along the stroke axis FA.

Referring to FIG. 1, the filling element 1 includes an annular lower housing-part 9 and an upper housing-part 11 that lies above the lower housing-part 9. The lower housing-part 9 is made of plastic or a non-magnetic material.

The upper-channel section 3.1 passes through the upper housing-part 11. The valve element 8 is guided to be displaceable through the lower housing-part 9 vertically along the stroke axis FA. Connecting rods 10 connect the upper and lower housing-parts 11, 9 to each other. The upper housing-part 11 connects to a machine element such as a liquid filling-material tank or a rotor.

A seal 12 defines a flexible connection between the upper housing-part 11 and the end of the valve element 8 facing the upper housing-part 11. The seal 12, which in the illustrated embodiment includes a bellows, surrounds the valve body 6 and defines an annular middle channel-section 3.3 of the liquid channel 3 through which the valve body 6 extends. The middle channel-section connects the upper and lower channel-sections 3.1, 3.2. The flexibility of this seal 12 permits the valve element 8 to move.

Connecting elements define a web 13 that extends across the upper-channel section 3.1 between the wall of the upper housing-part 11 and the upper-channel section 3.1. The web 13 suspends the valve body 6 and also permits filling material to flow around the valve body 6. Unlike the valve element 8, the valve body 6 does not move significantly during opening and closing of the liquid valve 5.

An electromagnetic drive 14 formed in the lower housing-part 9 opens and closes the liquid valve 5. The electromagnetic drive 14 includes a magnetic coil arrangement 15 having first and second magnetic coils 15.1, 15.2 that are offset relative to each other along the stroke axis FA and concentric with the valve element 8. This magnetic coil arrangement 15 forms the stator of the electromagnetic drive 14. The offset is such that the first ring coil 15.1 exhibits a greater axial distance interval from the lower valve-body section 6.1 than the second ring coil 15.2.

The first and second ring coils 15.1, 15.2 surround the valve element 8 and a magnet 16 mounted thereon. In particular, when activating the first ring coil 15.1 and deactivating the second ring coil 15.2 opens the liquid valve 5 as shown in FIG. 1. Conversely, deactivating the first ring coil 15.1 and activating the second ring coil 15.2 closes the liquid valve 5, as shown in FIG. 2. The first ring coil 15.1 and the magnet 16 are arranged such that when the liquid valve 5 is closed, the magnet 16 is not yet fully surrounded by the first ring coil 15.1. This ensures that the valve seat 7 contacts the lower valve-body section 6.1 with sufficient tension to securely close the liquid valve 5.

Some embodiments include more than two ring coils. This permits intermediate states in which the liquid valve 5 is neither fully open nor fully closed.

Between the magnetic coil arrangement 15 and the valve element 8 is a magnetic gap 17. This magnetic gap 17 is therefore outside the liquid channel 3.

Figure 3:
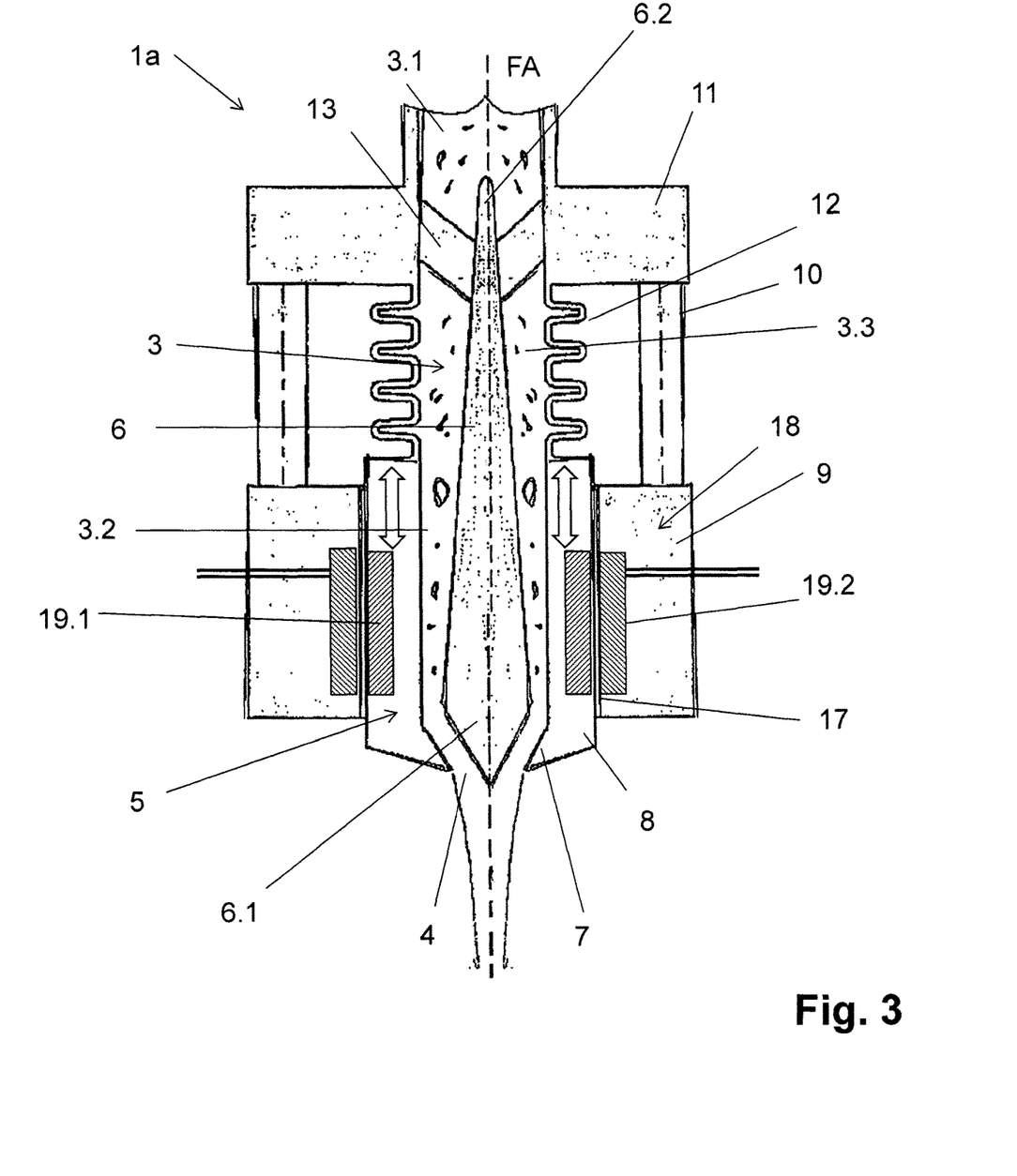
FIGS. 3-5 likewise in simplified schematic representations and in section, further embodiments of the filling element according to the invention.

FIG. 3 shows a second embodiment of the filling element 1a that differs from the first embodiment of the filling element 1 by using a linear drive 18 to move the valve element 8 relative to the valve body 6. A magnetic pole arrangement 19.1 mounted on the valve element 8 results in the valve element 8 forming the rotor of the linear drive 18. The magnetic pole arrangement 19.1 features magnetic poles following one another in the direction of the stroke axis FA. These magnetic poles are formed by placing permanent magnets with different polarities along the wall of the valve element 8. An electromagnetic coil 19.2 at the lower housing-part 9 then forms the stator of the linear drive 18.

The linear drive 18 makes it possible to move the valve element 8 into almost any desired position between the closed position and the opened position and to also control the speed of this movement. As was the case in the first embodiment, a magnetic gap 17 between the magnetic pole arrangement 19.1 and the electromagnetic coil 19.2 lies outside the liquid channel 3.

Figure 4:
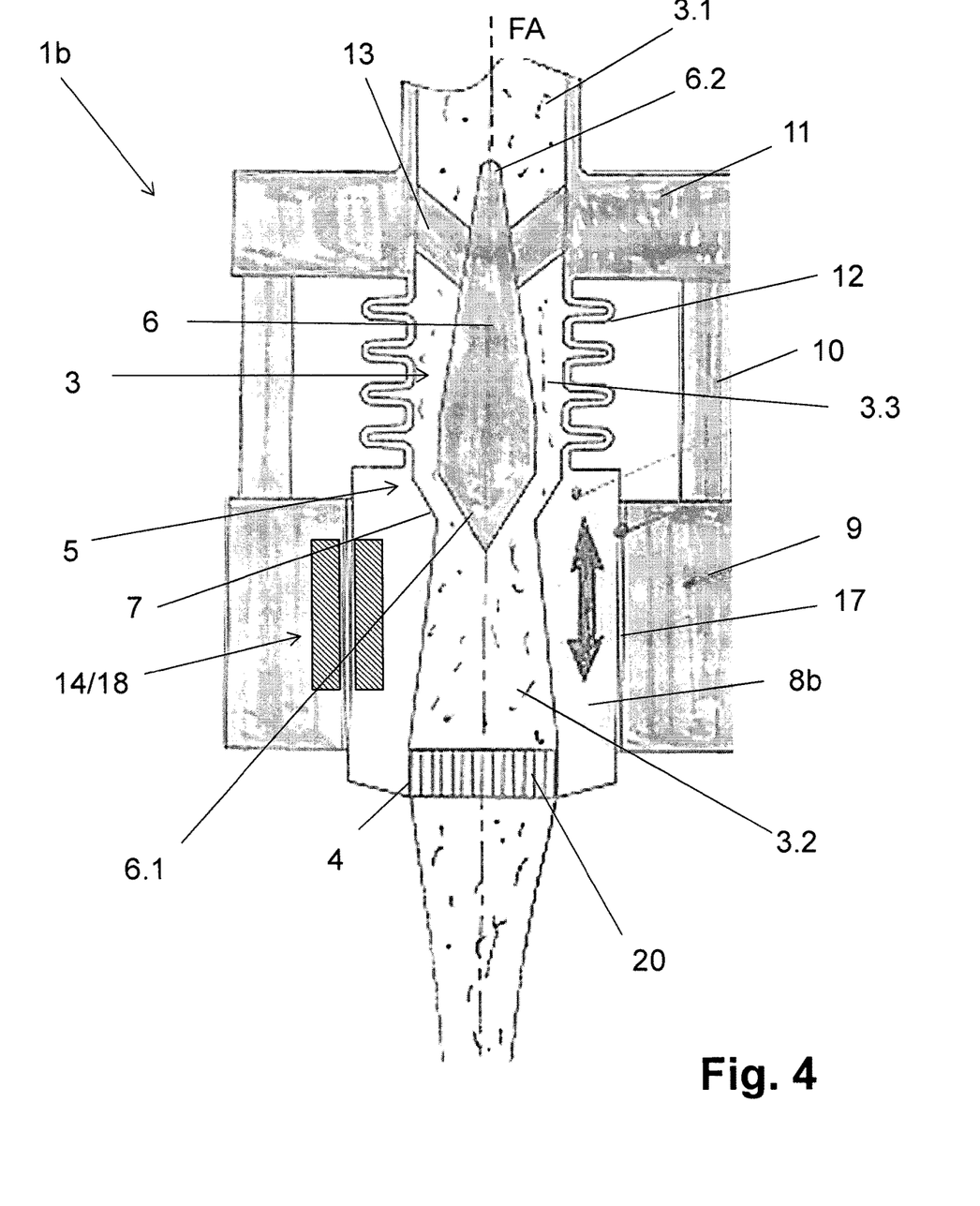

FIG. 4 shows a third embodiment of a filling element 1b having a valve element 8b in which the interaction of the valve seat 7 and the valve body 7 takes place an upper region of the valve element 8*b*, far way from the dispensing opening 4. As was the case in the preceding embodiment, a linear drive 18 moves the valve element 8*b* relative to the stationary valve body 6.

A gas barrier 20 at the dispensing opening 4 prevents dripping after the liquid valve 5 has been closed. The gas barrier 20 is implemented as a screen or sieve.

Among the features that the filling elements 1, 1*a*, 1*b* have in common is that the valve seat 7 interacting with the a lower valve-body section 6.1 is provided inside the valve element 8, 8*b*, and, relative to the valve axis or stroke axis FA, exhibits an axial distance interval from the end of the valve element 8, 8*b* respectively, that forms a dispensing opening 4 or is located closer to this dispensing opening 4, which is smaller than the axial length of the valve element 8, 8*b* respectively, wherein, with the filling elements 1, 1*a*, this distance interval is smaller than half the axial length of the valve element 8, and with the filling element 1*b* is larger than half the axial length of the valve element 8*b*.

Figure 5:
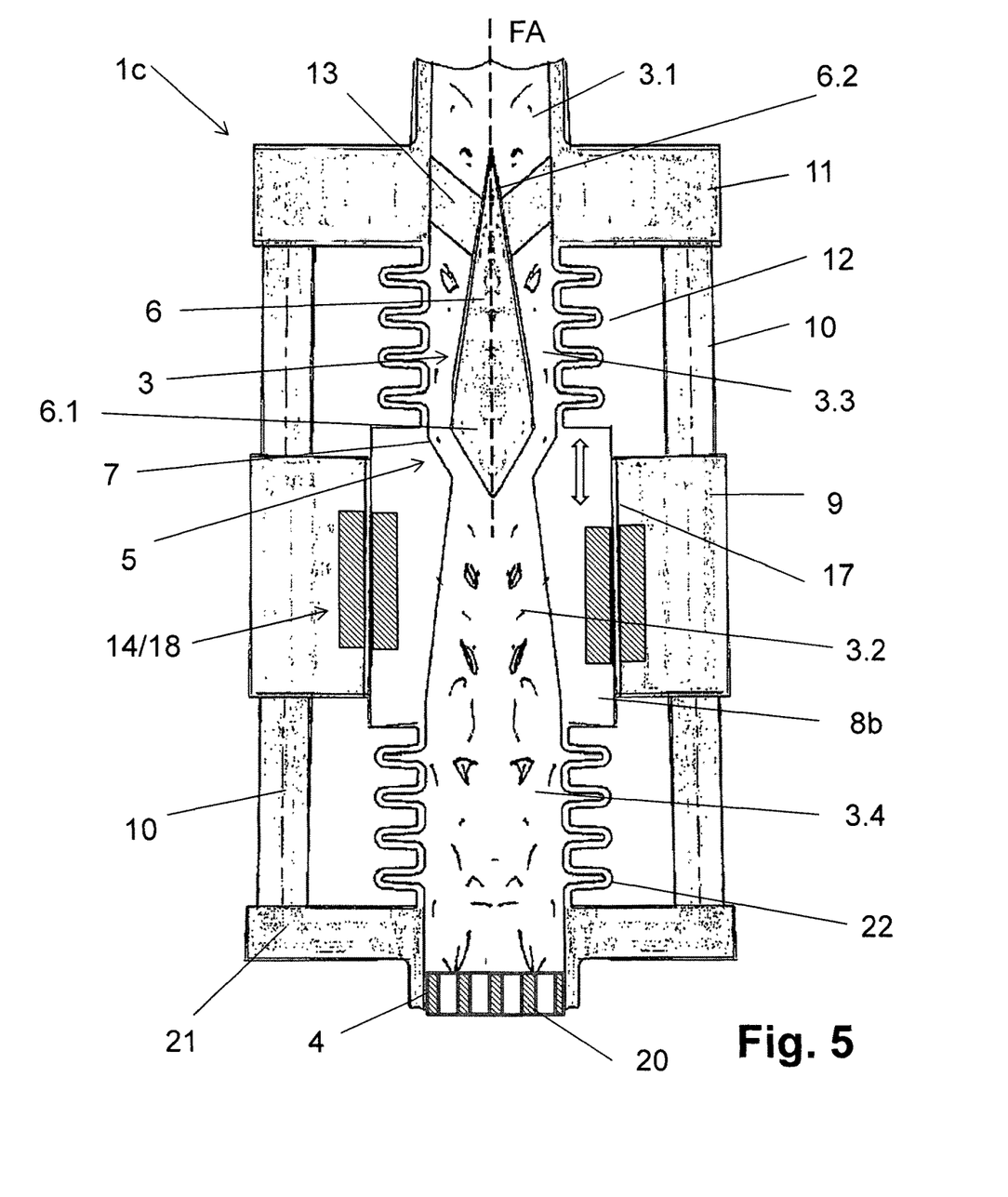

FIG. 5 shows a further embodiment of the invention a filling element 1*c*, which differs from the filling element 1*b* essentially only in that the dispensing opening 4, which, for example, is in turn provided with the gas barrier 20, is located in a lower housing-part 21, which is connected by the connecting rods 10 to the lower housing-part 9 and also to the upper housing-part 11. In this embodiment, the liquid channel 3 comprises at the lower channel-section 3.2, formed in the valve element 8*b*, a distal channel-section 3.4 connecting to this, which opens at the dispensing opening 4 and is formed inside a flexible connection or seal 22, connecting the valve element 8*b* to the housing part 21 and making possible the movement of the valve element 8*b*, which in the embodiment represented is likewise a folding bellows or folding bellows seal.

The actuation of the valve element 8*b* relative to the non-moved valve body 6 takes place electromagnetically, for example by way of the drive 14 or the linear drive 18. Since the dispensing opening 4 is formed in a fixed housing part 21, the filling element 1*c* is also well-suited for filling systems in which the liquid filling-material flows to the container 2 not in a free jet, but rather the container 2 in contact during the filling with its container opening against the underside of the filling element 1*c*, for example when sealed against the filling element 1*c*.

The filling elements 1*a*, 1*c* described herein are constituent parts of filling systems that comprise a plurality of filling elements of the same type. In some embodiments, the filling elements 1*a*, 1*c* are constituent parts of a rotating filling machine in which with the filling elements are on a rotating rotor.

Figure 6:
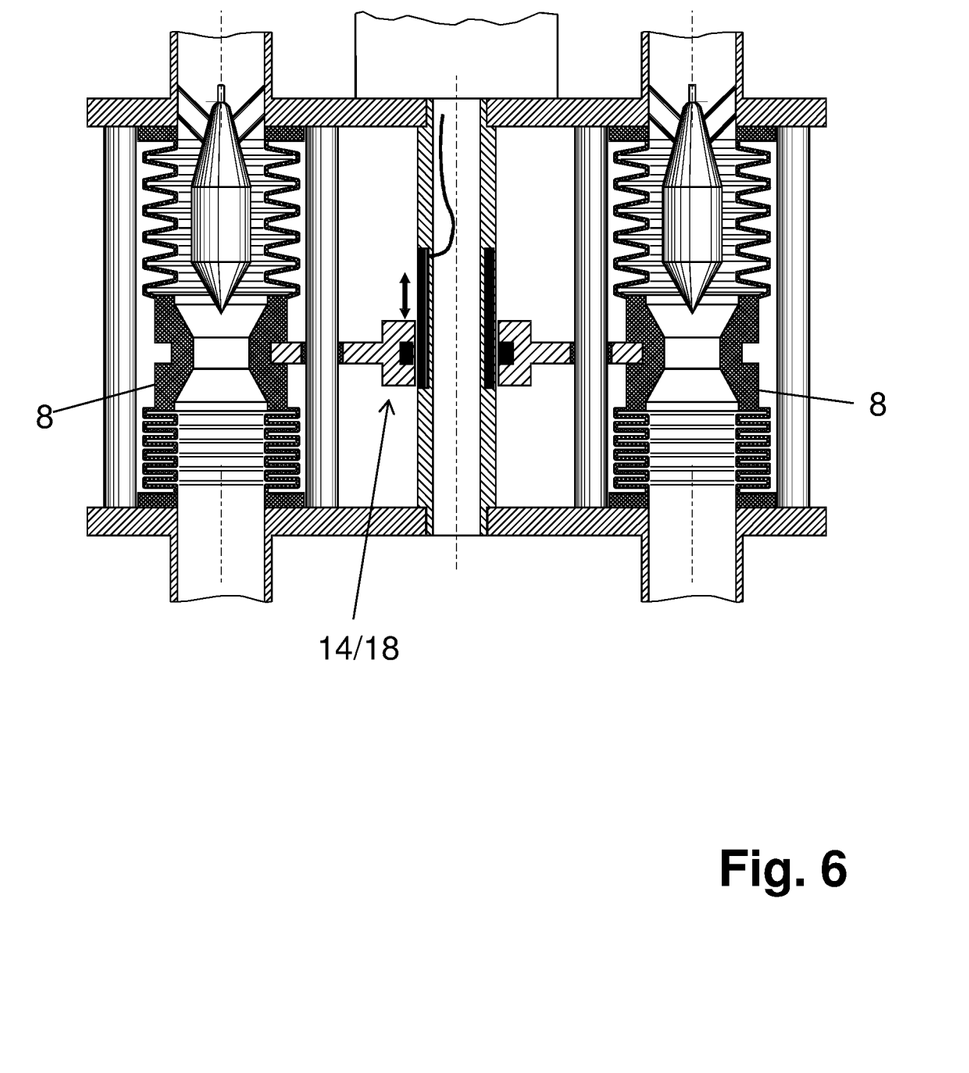
FIG. 6 is a schematic representation, a filling element according to the invention in the opened state, which is configured as a double or multiple filling valve, and therefore actuates at least two filling valves with only one drive unit.

FIG. 6 shows a filling element that uses one electromagnetic drive 14 or one linear drive 18 to actuate two different valve elements 8.

The arrangement shown in FIG. 6 achieves substantial cost advantages. These cost advantages can be increased inasmuch as more than two valve elements 8 can be moved with only one electromagnetic drive 14 or linear drive 18. In this situation it is also possible for three valve elements 8 to be moved by two electromagnetic drives 14 or by two linear drives 18.

The embodiments described herein share in common the ability to open and close the liquid valve 5 with an electromagnetic actuator. This avoids having mechanical and pneumatic actuation elements arranged in the liquid channel 3.

The embodiments also share the feature of having the magnetic gap 17 necessary for this electromagnetic actuation be located outside the liquid channel 3 and formed between the outer surface of the valve element 8, 8*b*, facing away from the liquid channel 3 and the adjacent surface of the lower housing-part 9. The electromagnetic actuation of the valve element 8, 8*b* simplifies control of the liquid valves 5 by avoiding the use of pneumatic and electro-pneumatic actuators.

The embodiments also share in common the feature that the liquid filling-material does not flow through the magnetic gap 17. This enables the magnetic gap 17 to have a reduced gap width. Such a reduced gap width promotes more reliable and more energy-efficient movement of the valve element 8, 8*b*.

In the embodiments described herein, the middle channel-sections 3.3 and the distal channel-section 3.4 are formed between the moving valve element 8, 8*b* the upper housing-part 11 and lower housing-part 21 respectively using flexible connections and seals 12, 22 implemented as folding bellows seals. Other structural design measures that will permit movement of the valve element 8, 8*b* for opening and closing of the liquid valve 5 while still sealing the liquid channel 3 from the outside. Examples of additional flexible seals 12, 21 include roll membranes and flexible lines, such as hoses.

Having described the invention, and a preferred embodiment thereof, what is claimed as new and secured by Letters Patent is:

The invention claimed is:

1. An apparatus comprising a filling element for controlled dispensing of liquid filling-material into a container through a liquid channel that ends in a dispensing opening on an underside of the filling element, wherein said filling element comprises a liquid valve that is controllable to open and close, wherein the liquid valve comprises a drive, a valve body and, a valve element, wherein the valve body is arranged in the liquid channel, wherein the valve element forms a lower channel-section of the liquid channel, wherein the drive moves the valve element along a stroke axis such that the valve element moves relative to the valve body, wherein the drive comprises an electromagnetic drive that comprises a magnetic gap across which a magnetic field extends, wherein said magnetic gap is disposed outside of said liquid channel, and wherein the magnetic field couples to one of said valve element and an element coupled to said valve element.

2. The apparatus of claim 1, wherein said filling element comprises a housing part that does not move with said valve element, wherein said drive comprises a stator, and wherein said stator is provided at least in part on said housing part.

3. The apparatus of claim 1, wherein an outer face of said valve element forms said magnetic gap and wherein said outer face faces away from said liquid channel.

4. The apparatus of claim 1, wherein said valve body comprises a lower valve-body section, wherein said valve element forms a valve seat, wherein said dispensing opening is between said lower valve-body section and said valve seat, and wherein said valve seat moves with said valve element.

5. The apparatus of claim 1, wherein said drive comprises a stator, wherein said stator comprises a magnetic coil arrangement, wherein said magnetic coil arrangement comprises first and second magnetic coils, wherein said first and second magnetic coils are offset from each other along a stroke axis of said filling element, wherein activating said first magnetic coil and deactivating said second magnetic coil causes said liquid valve to open, and wherein deactivating said first magnetic coil and activating said second magnetic coil causes said liquid valve to close.

6. The apparatus of claim 1, wherein said electromagnetic drive comprises a permanent magnet disposed on said valve element and wherein first and second magnetic coils couple to said permanent magnet across said gap.

7. The apparatus of claim 1, wherein said electromagnetic drive comprises a linear drive having a magnetic pole arrangement and a coil separated by said magnetic gap, wherein said magnetic pole arrangement is disposed on said valve element, wherein said magnetic pole arrangement interacts with said coil, and wherein said coil remains stationary as said valve element moves.

8. The apparatus of claim 1, wherein said gap serves as a sliding guide for said valve element.

9. The apparatus of claim 1, further comprising a flexible seal, wherein said flexible seal connects said valve element to a housing part that remains stationary as said valve element moves vertically, and wherein said seal defines a portion of said liquid channel.

10. The apparatus of claim 1, further comprising a bellows that provides a flexible connection between said valve element and a housing such that said liquid channel extends through said bellows, wherein said bellows defines an annular middle-channel section of said liquid channel.

11. The apparatus of claim 1, further comprising a valve seat formed by said valve element, where said valve seat moves with said valve element and interacts with a lower valve-body section of said valve body, and wherein said valve seat is axially offset from said opening.

12. The apparatus of claim 1, wherein said filling element is configured to fill at least two containers at the same time.

13. The apparatus of claim 1, wherein said valve element is one of a plurality of identical valve elements, all of which are movable by said electromagnetic drive.

14. The apparatus of claim 1, further comprising a filling machine for filling containers with said liquid filling-product, wherein said filling element is one of a plurality of identical filling elements on said filling machine.

15. The apparatus of claim 1, wherein no part of said gap is within said liquid channel and wherein the gap is entirely outside the liquid channel.

16. The apparatus of claim 1, wherein liquid filling material does not flow through said magnetic gap.

17. The apparatus of claim 1, further comprising a sieve disposed at said opening.

* * * * *